United States Patent
Liow et al.

(10) Patent No.: US 7,995,434 B2
(45) Date of Patent: Aug. 9, 2011

(54) METHOD AND APPARATUS FOR GENERATING ABSOLUTE TIME IN PREGROOVE DATA

(75) Inventors: Stanley Liow, Hsin-Tien (TW); Kobe Chou, Hsin-Tien (TW)

(73) Assignee: Tian Holdings, LLC, Wilmington, DE (US)

( * ) Notice: Subject to any disclaimer, the term of this patent is extended or adjusted under 35 U.S.C. 154(b) by 226 days.

(21) Appl. No.: 12/342,004

(22) Filed: Dec. 22, 2008

(65) Prior Publication Data
US 2009/0103402 A1  Apr. 23, 2009

(30) Foreign Application Priority Data

Mar. 31, 2004 (TW) .................. 93108817 A

(51) Int. Cl.
*G11B 7/00* (2006.01)
(52) U.S. Cl. .............. 369/47.27; 369/44.13; 369/47.19; 369/47.31
(58) Field of Classification Search .............. 369/44.13, 369/47.19, 47.27, 47.31
See application file for complete search history.

(56) References Cited

U.S. PATENT DOCUMENTS

| | | | |
|---|---|---|---|
| 5,003,521 A | 3/1991 | Yoshida et al. |
| 5,381,392 A | 1/1995 | Hira |
| 5,506,824 A | 4/1996 | Fairchild et al. |
| 5,724,325 A | 3/1998 | Jeong |
| 5,745,460 A | 4/1998 | Tateishi |
| 5,764,610 A | 6/1998 | Yoshida et al. |
| 5,831,952 A | 11/1998 | Yamada et al. |
| 5,903,531 A | 5/1999 | Satoh et al. |
| 5,917,791 A | 6/1999 | Tsuchiya et al. |
| 5,959,955 A | 9/1999 | Choi |
| 6,005,832 A | 12/1999 | Kumagai |
| 6,052,344 A | 4/2000 | Ueki |
| 6,212,141 B1 | 4/2001 | Tanikawa et al. |
| 6,249,499 B1 | 6/2001 | Andoh |
| 6,295,260 B1 | 9/2001 | Shihara et al. |
| 6,304,535 B1 | 10/2001 | Magome et al. |
| 6,449,232 B1 | 9/2002 | Kuwahara et al. |

(Continued)

FOREIGN PATENT DOCUMENTS

BR    PI0418819 A    11/2003

(Continued)

OTHER PUBLICATIONS

Search and Examination Report for GB Application No. 0324645.1, Mail Date Nov. 22, 2004, 8 pages.

(Continued)

*Primary Examiner* — Adam R Giesy
(74) *Attorney, Agent, or Firm* — Perkins Coie LLP

(57) ABSTRACT

An apparatus and a method for generating ATIP data is provided. The apparatus generates ATIP data from a wobble signal of a re-writable compact disc. The apparatus includes a frequency demodulator for demodulating the wobble signal to generate an original ATIP data signal; an ATIP clock generating circuit for generating an ATIP clock signal based on the wobble signal; and a data generating circuit, coupled to the frequency demodulator and the ATIP clock generating circuit, for generating the ATIP data based on the number of measurement periods for which the original ATIP data signal is at a first logic level during one period of the ATIP clock signal. This apparatus uses this number and the bi-phase rule to precisely generate ATIP data.

15 Claims, 10 Drawing Sheets

U.S. PATENT DOCUMENTS

| | | |
|---|---|---|
| 6,459,666 B1 | 10/2002 | Yokoi |
| 6,603,720 B1 | 8/2003 | Kuroda et al. |
| 6,700,847 B2 | 3/2004 | Osada |
| 6,728,181 B2 | 4/2004 | Shimoda et al. |
| 6,747,931 B1 | 6/2004 | Park et al. |
| 6,760,289 B1 | 7/2004 | Ide |
| 6,807,136 B1 | 10/2004 | Grimm |
| 6,816,443 B1 | 11/2004 | Hwang et al. |
| 6,822,936 B2 | 11/2004 | Ono et al. |
| 6,856,586 B2 | 2/2005 | Usui et al. |
| 6,868,051 B2 | 3/2005 | Ogihara |
| 6,909,678 B2 | 6/2005 | Morishima |
| 6,925,039 B2 | 8/2005 | Yanagawa et al. |
| 6,980,500 B2 | 12/2005 | Lu et al. |
| 6,992,961 B2 | 1/2006 | Minase et al. |
| 7,016,284 B2 | 3/2006 | Chou |
| 7,046,593 B2 | 5/2006 | Ito |
| 7,099,253 B2 | 8/2006 | Hsu et al. |
| 7,136,340 B2 | 11/2006 | Ide et al. |
| 7,570,561 B2 | 8/2009 | Tai |
| 7,602,684 B2 | 10/2009 | Chen et al. |
| 7,626,907 B2 | 12/2009 | Chang et al. |
| 2002/0015017 A1 | 2/2002 | Kwag |
| 2002/0075780 A1 | 6/2002 | Ogihara |
| 2002/0105895 A1 | 8/2002 | Tanaka |
| 2002/0126607 A1 | 9/2002 | Yamamoto et al. |
| 2002/0150017 A1 | 10/2002 | Ono et al. |
| 2003/0048120 A1* | 3/2003 | Chou ............................ 327/165 |
| 2003/0081516 A1* | 5/2003 | Takumai et al. ........... 369/47.31 |
| 2003/0099171 A1 | 5/2003 | Ito |
| 2003/0103428 A1 | 6/2003 | Lu et al. |
| 2003/0206501 A1* | 11/2003 | Song et al. ................... 369/30.1 |
| 2004/0081049 A1 | 4/2004 | Chan |
| 2004/0090883 A1 | 5/2004 | Lee et al. |
| 2004/0090895 A1 | 5/2004 | Lee et al. |
| 2004/0130986 A1 | 7/2004 | Minase et al. |
| 2004/0218497 A1 | 11/2004 | Choi et al. |
| 2005/0047300 A1 | 3/2005 | Ono et al. |
| 2005/0058036 A1 | 3/2005 | Chen et al. |
| 2005/0105433 A1 | 5/2005 | Juan et al. |
| 2005/0226114 A1 | 10/2005 | Liow et al. |
| 2005/0265188 A1 | 12/2005 | Chang et al. |
| 2005/0265189 A1 | 12/2005 | Tai |
| 2006/0198268 A1 | 9/2006 | Chan |

FOREIGN PATENT DOCUMENTS

| | | |
|---|---|---|
| BR | PI0418821 A | 11/2007 |
| CN | 1348181 | 5/2002 |
| CN | 1366660 | 8/2002 |
| CN | 1490790 | 4/2004 |
| CN | 1591643 A | 3/2005 |
| CN | 1601639 | 3/2005 |
| CN | 1637909 | 7/2005 |
| CN | 1659312 A | 8/2005 |
| CN | 1700311 | 11/2005 |
| DE | 10349161 A1 | 6/2004 |
| EP | 0725395 | 6/1996 |
| EP | 0784321 | 7/1997 |
| EP | 0811971 | 12/1997 |
| EP | 0813192 | 12/1997 |
| EP | 0903735 | 3/1999 |
| GB | 2394596 | 4/2004 |
| JP | 10302381 | 11/1998 |
| JP | 2000078392 | 3/2000 |
| JP | 2000315355 A | 11/2000 |
| JP | 2000322742 | 11/2000 |
| JP | 2001126376 | 5/2001 |
| JP | 2001167510 | 6/2001 |
| JP | 2001265620 | 9/2001 |
| JP | 2002007156 | 1/2002 |
| JP | 2002119830 A | 4/2002 |
| JP | 2002312933 A | 10/2002 |
| JP | 2003016441 A | 1/2003 |
| JP | 2003078392 | 3/2003 |
| JP | 2003217135 | 7/2003 |
| TW | 200511273 | 3/2003 |
| TW | 200539114 | 12/2005 |
| TW | 200539115 | 12/2005 |
| TW | 253060 | 4/2006 |
| TW | 1298156 | 8/2008 |
| WO | WO-03005350 A1 | 1/2003 |
| WO | WO-2005117008 A1 | 12/2005 |
| WO | WO-2005117009 A1 | 12/2005 |

OTHER PUBLICATIONS

Search and Examination Report for GB Application No. 0324645.1, Mail Date Feb. 9, 2004, 1 page.

German Search Report for German Application No. 10349161.9, Mail Date Nov. 17, 2004, 4 pages.

International Publication with Search Report for PCT Application No. PCT/CN2004/001531; Applicant: Via Technologies, Inc.; Date of Mailing: Mar. 31, 2005; 19 pages.

Written Opinion for Application No. PCT/CN2004/001531; Applicant: Via Technologies, Inc.; Date of Mailing: Apr. 7, 2005; 4 pages.

International Preliminary Examination Report on Patentability for PCT Application No. PCT/CN2004/001531; Applicant: Via Technologies, Inc.; Date of Issuance: Nov. 29, 2006; 5 pages.

International Publication with Search Report for PCT Application No. PCT/CN2004/001409; Applicant: Via Technologies, Inc.; Date of Mailing: Mar. 10, 2005; 21 pages.

Written Opinion for Application No. PCT/CN2004/001409; Applicant: Via Technologies, Inc.; Date of Mailing: Mar. 10, 2005; 4 pages.

International Preliminary Examination Report on Patentablility for PCT Application No. PCT/CN2004/001409; Applicant: Via Technologies, Inc.; Date of Issuance: Nov. 29, 2006; 5 pages.

First Office Action for TW Patent Application No. 93127819; Issued by the Taiwan Intellectual Property Office on Jun. 24, 2008; 7 pages [summary attached].

Second Office Action for TW Patent Application No. 93127819; Issued by the Taiwan Intellectual Property Office on Jun. 24, 2008; 6 pages [summary attached].

Third Office Action for TW Patent Application No. 93127819; Issued by the Taiwan Intellectual Property Office on Jul. 29, 2009; 11 pages [summary attached].

Fourth Office Action for TW Patent Application No. 93127819; Issued by the Taiwan Intellectual Property Office on Nov. 11, 2009; 6 pages [translation attached].

First Office Action for TW Patent Application No. 91310202; Issued by the Taiwan Intellectual Property Office on Mar. 21, 2008; 5 pages [summary attached].

* cited by examiner

METHOD AND APPARATUS FOR GENERATING ABSOLUTE TIME IN PREGROOVE DATA

CROSS-REFERENCE TO RELATED APPLICATION

This application claims the priority benefit of Taiwan application serial no. 93108817, filed on Mar. 31, 2005. All disclosure of the Taiwan application is incorporated herein by reference.

BACKGROUND

1. Field of the Invention

This invention generally relates to a method of generating absolute time in pregroove (ATIP) data, and more particularly to a method of generating ATIP data based on an original ATIP data signal generated by a wobble signal and an ATIP clock signal.

2. Description of Related Art

During the manufacture of the re-writable compact disk (CR-RW), a shallow groove is made to spiral from the center of the CD-RW toward the outer circumference. This groove is referred to as a pregroove. This pregroove is not a perfect spiral but includes a little wobbling. Generally, in a compact disk (CD) made by die-casting, each sector includes the timing-related data to control the spin speed of the CD-ROM drive in order to accurately read the data on the CD. A CD-RW drive must have some way to control the laser when recording the data and to control the spin speed. The wobbling pregroove provides ATIP data which may be used to control the tracking and timing of the CD-RW drive.

The wobbling shape of the pregroove is similar to a sinusoid and has a track excursion deviation range of 0.03 um from the centerline of the data recording track. This range is $\frac{1}{1000}$ of the wavelength of the pregroove. That is why the pregroove is referred to as "wobbling". Although the pregroove is almost invisible, the optical driving device of the CD-RW drive can detect the pregroove and use the pregroove to guide the laser beam of the CD-RW drive and to provide ATIP data for ensuring a stable data recording speed.

Therefore, how to effectively read the wobble signal from the CD-RW and to effectively obtain the ATIP data from the wobble signal is an important issue in CD-RW applications.

SUMMARY

The present invention is directed to an apparatus for reading ATIP data by generating an ATIP clock signal.

The present invention is also directed to a method of reading ATIP data by generating an ATIP clock signal.

The present invention is directed to a method of reading ATIP data by using a bi-phase rule to generate ATIP data according to a synchronization pattern.

An embodiment of the present invention includes an apparatus for generating ATIP data based on a wobble signal read from a re-writable compact disc. The apparatus comprises a frequency demodulator for demodulating the wobble signal to generate an original ATIP data signal (ATIPORG signal); an ATIP clock generating circuit for generating an ATIP clock signal (ATIPCLK signal) based on the wobble signal; and an ATIP data generating circuit, coupled to the frequency demodulator and the ATIP clock generating circuit, for generating the ATIP data (ATIPDATA signal) based on a number of measurement periods during one period of the ATIPCLK signal for which the ATIPORG signal is at a first logic level.

In an embodiment of the present invention, the ATIP clock generating circuit includes: a counter for counting the wobble signal to generate an ATIPCLK signal, to provide the ATIPCLK signal to the ATIP data generating circuit, and to set the period of the ATIPCLK signal to be 3.5 periods of the wobble signal; and an alignment signal generating circuit for detecting when the ATIPORG signal has been at a same level for a predetermined length of time, and for generating an alignment signal to align the ATIPCLK signal to the wobble signal.

In an embodiment of the present invention, the frequency demodulator further comprises: a high frequency (HF) counter, for receiving the wobble signal and generating count data (FMPRD data) for each half-period of the wobble signal; and a low pass filter (LPF), for receiving the FMPRD data and to determine an average half-period of the wobble signal; wherein the frequency demodulator subtracts the average half-period of the wobble signal from the FMPRD data to obtain differential data (PRDDIFF data), and the ATIPORG signal is determined by the PRDDIFF data for each half-period of the wobble signal: the ATIPORG signal is asserted to the first logic level when the PRDDIFF data for a half-period of the wobble signal is positive or zero; and the ATIPORG signal is de-asserting to a second logic level when the PRDDIFF data for a half-period of the wobble signal is negative.

In an embodiment of the present invention, the step of generating the ATIP data signal includes: demodulating a wobble signal to generate the ATIPORG signal and the PRDDIFF data where the wobble signal is generated by reading a re-writable compact disc; generating the ATIPCLK signal based on the wobble signal; and counting the number of measurement periods during a period of the ATIPCLK signal for which the ATIPORG signal is at a first logic level.

In an embodiment of the present invention, the step of generating the ATIP data signal by using one predetermined threshold further includes: comparing a number of measurement periods during a period of the ATIPCLK signal for which the ATIPORG signal is at the first logic level with a predetermined threshold; asserting the ATIP data to the first logic level when the number is larger than or equal to the predetermined threshold; and de-asserting the ATIP data to a second logic level when the number is smaller than the predetermined threshold.

In an embodiment of the present invention, the step of generating the ATIP data signal by using two predetermined thresholds further includes: adding all PRDDIFF data for a period of the ATIPCLK signal to obtain adding data; comparing the number of measurement periods during a period of the ATIPCLK signal for which the ATIPORG signal is at the first logic level with a first predetermined threshold and a second predetermined threshold, where the first predetermined threshold is larger than the second predetermined threshold; asserting the ATIP data to the first logic level when the number is larger than the first predetermined threshold; and de-asserting the ATIP data to a second logic level when the number is smaller than the second predetermined threshold; and when the number is between the first and the second predetermined thresholds: asserting the ATIP data to the first logic level when the adding data is positive; and de-asserting the ATIP data to the second logic level when the adding data is negative.

In an embodiment of the present invention, the step of demodulating the wobble signal to generate the ATIPORG signal further comprises: receiving the wobble signal and generating FMPRD data for each half-period of the wobble signal; determining an average half-period of the wobble signal from the FMPRD data; subtracting the average half-period of the wobble signal from the FMPRD data to obtain PRDDIFF data for each half-period of the wobble signal; and generating the ATIPORG signal based on the PRDDIFF data.

In an embodiment of the present invention, the step of generating the ATIPORG signal based on the PRDDIFF data comprises: asserting the ATIPORG signal at the first logic level when the PRDDIFF data is positive or zero; and asserting the ATIPORG signal at the second logic level when the PRDDIFF data is negative.

In an embodiment of the present invention, the step of generating the ATIPCLK signal based on the wobble signal comprises: counting the wobble signal to generate the ATIPCLK signal, the period of the ATIPCLK signal being 3.5 periods of the wobble signal; and aligning the ATIPCLK signal to the wobble signal with a status transition when the ATIPORG signal is at a same level for a predetermined period of time; wherein the predetermined period of time is an integral multiple of 3.5 periods of the wobble signal.

In an embodiment of the present invention, the wobble signal is digitized and processed by a de-glitch process.

In an embodiment of the present invention, a step of generating the ATIP data according to a bi-phase rule and a synchronization pattern comprises: demodulating a wobble signal to generate an ATIPORG signal and PRDDIFF data, wherein the wobble signal is generated by reading a re-writable compact disc; generating an ATIPCLK signal based on the wobble signal; defining the next period of the ATIPCLK signal as a first period when a portion of the generated ATIP data matches a synchronization pattern (sync pattern); and generating ATIP data based on the number of measurement periods during a period of the ATIPCLK signal for which the ATIPORG signal is at the first logic level for a $2N^{th}$ period of the ATIPCLK signal and the number of measurement periods during a period of the ATIPCLK signal for which the ATIPORG signal is at the first logic level for a $2N+1^{st}$ period of the ATIPCLK signal, wherein N is a positive integer.

In an embodiment of the present invention, the step of generating the ATIP data further comprises: counting a number W1 of measurement periods during a period of the ATIPCLK signal for which the ATIPORG signal is at the first logic level for the $2N^{th}$ period of the ATIPCLK signal; counting a number W2 of measurement periods during a period of the ATIPCLK signal for which the ATIPORG signal is at the first logic level for the $2N+1^{st}$ period of the ATIPCLK signal; adding the PRDDIFF data for the $2N^{th}$ period of the ATIPCLK signal to obtain adding data S1; adding the PRDDIFF data for the $2N+1^{st}$ period of the ATIPCLK signal to obtain adding data S2; and determining whether the current period of the ATIPCLK signal a $2N^{th}$ (EVEN) period or $2N+1^{st}$ (ODD) period.

In an embodiment of the present invention, the step of generating the ATIP data further comprises: making the ATIP data be an inversion of the ATIP data for a preceding period of the ATIPCLK signal when the period of the ATIPCLK signal is a $2N+1^{st}$ period; and comparing W1 and W2 when the period of the ATIPCLK signal is a $2N^{th}$ period.

In an embodiment of the present invention, the step of generating the ATIP data further comprises: asserting the ATIP data to the first logic level when W1>W2; de-asserting the ATIP data to a second logic level when W1<W2; and comparing adding data S1 and S2 when W1=W2.

In an embodiment of the present invention, the step of generating the ATIP data further comprises: asserting the ATIP data to the first logic level when S1>=S2; and de-asserting the ATIP data to the second logic level when S1<S2.

In light of the above, the present invention uses the status of the ATIPORG signal corresponding to the ATIPCLK signal and the bi-phase rule to precisely generate the ATIP data.

The above is a brief description of some deficiencies in the prior art and advantages of the present invention. Other features, advantages and embodiments of the invention will be apparent to those skilled in the art from the following description, accompanying drawings and appended claims.

DETAILED DESCRIPTION

Figure 1:
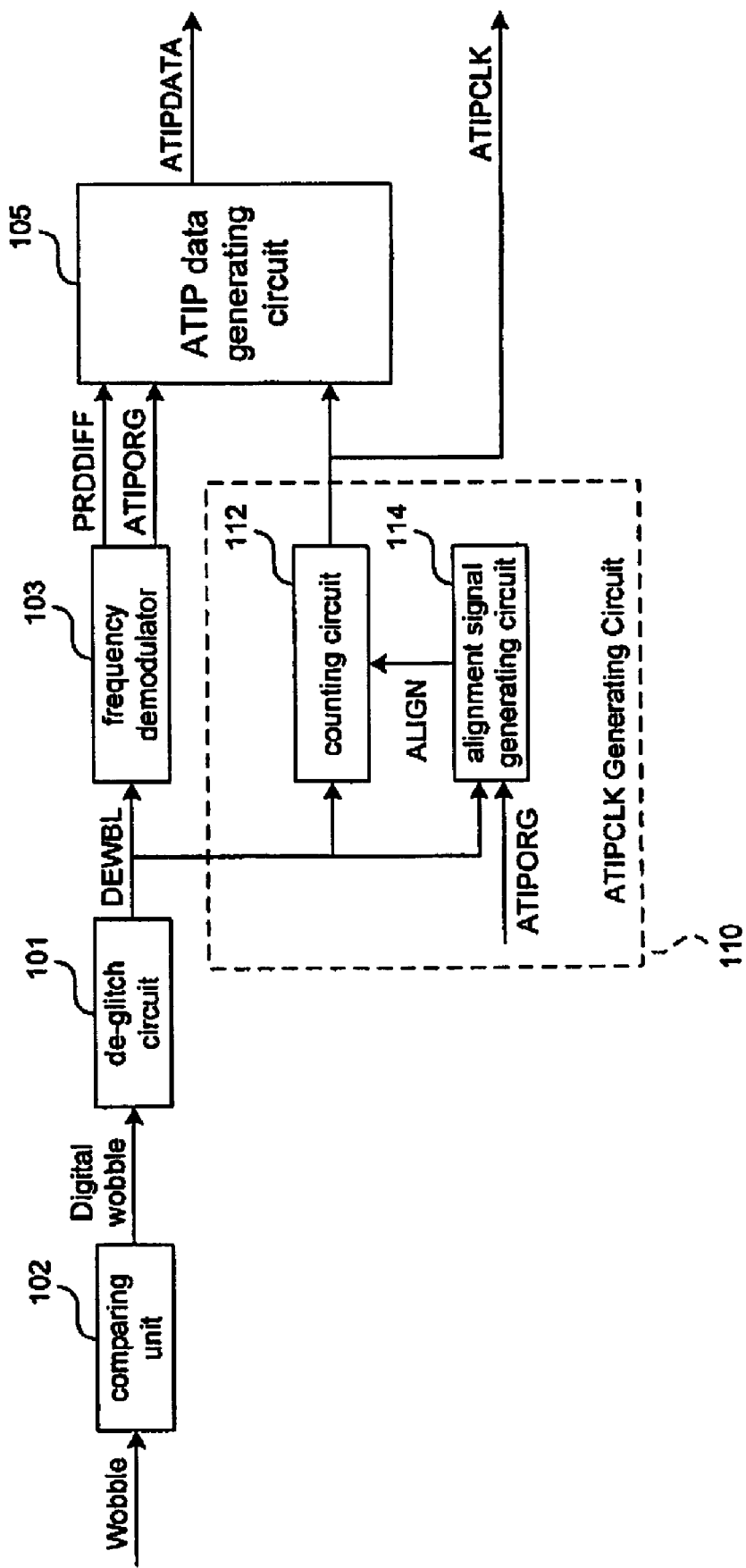
FIG. 1 is the block diagram of an apparatus for generating ATIP data in accordance with an embodiment of the present invention.

Please reference to FIG. 1, which is the block diagram of an apparatus for generating ATIP data in accordance with an embodiment of the present invention.

Generally, an optical driving device of the CD-RW drive detects pregrooves on an optical disc while recording to the disc. At that time, the optical drive receives a wobble signal and generates ATIP data from the wobble signal to obtain timing-related information. The wobble signal is a frequency-modulated signal.

Figure 4:
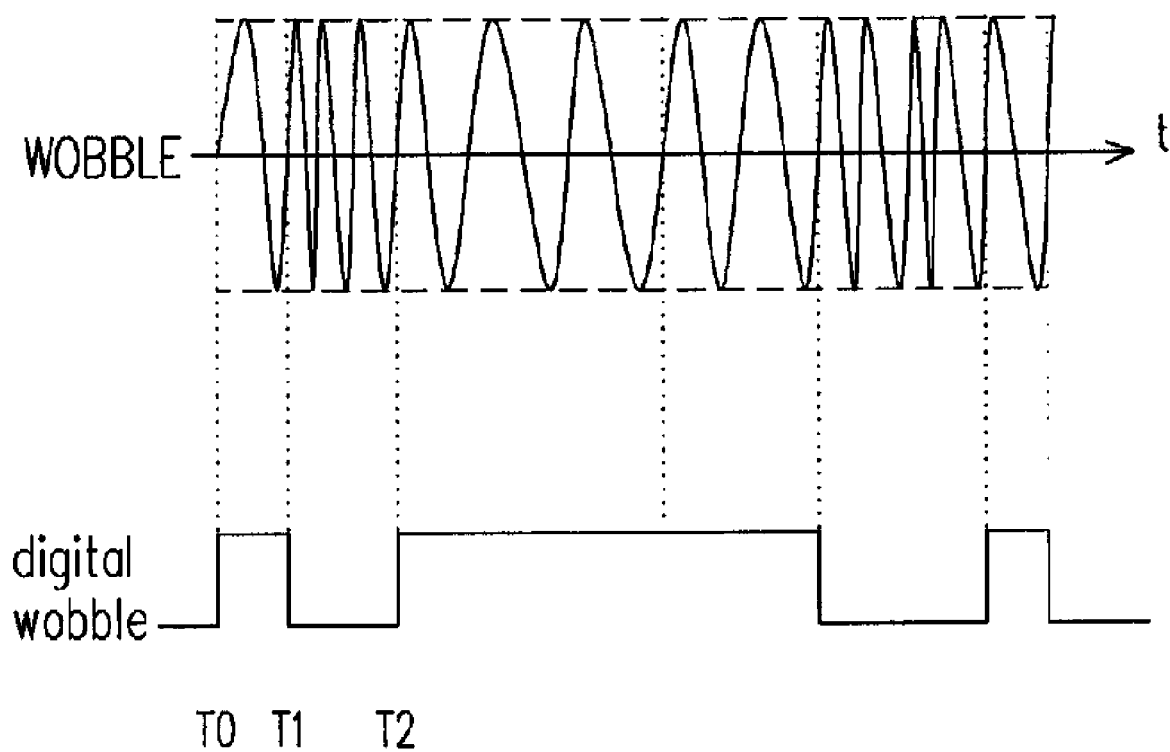
FIG. 4 is a timing diagram illustrating the generation of a digital wobble signal.

Please refer to FIG. 4, which is a timing diagram illustrating the generation of a digital wobble signal by comparing unit 102 of FIG. 1. As the wobble signal is frequency-modulated, the period of the wobble signal varies. As a practical matter, this variation of the wobble signal is minor (e.g., almost indistinguishable). To further illustrate how the digital wobble signal is generated the frequency variation of wobble signal WOBBLE is exaggerated by FIG. 4.

When the comparing unit 102 receives the wobble signal, the comparing unit 102 compares the period of the wobble signal to an average half-period of the wobble signal. For example, during the time between T0 and T1, the period of the wobble signal is larger than the average half-period of the wobble signal, so the digital wobble signal is provided at a high logic level; and during the time between T1 and T2, the period of the wobble signal is smaller than the average half-period of the wobble signal, so the digital wobble signal is provided at a low logic level.

The wobble signal usually has some noise on it, so a de-glitch circuit 101 may be provided to remove glitches of the digital wobble signal and to generate a deglitched wobble signal (DEWBL). In practice, the variation of the period of the DEWBL signal is very limited.

Figure 9:
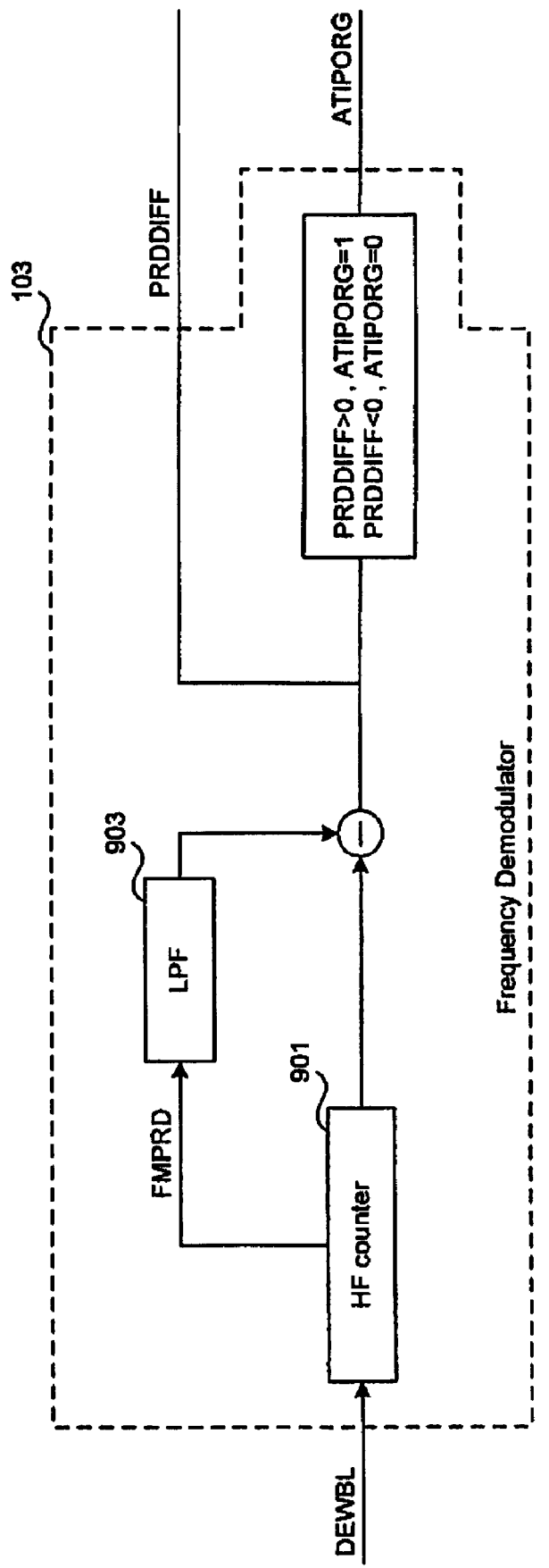
FIG. 9 is a block diagram of a frequency demodulator.

Since the wobble signal is a frequency-modulated signal, it is de-modulated by a frequency modulator. Please refer to FIGS. 1, 2 and 9. FIG. 9 is a block diagram of a frequency demodulator 103 of FIG. 1. In this embodiment, a high frequency (HF) counter 901 receives the DEWBL signal and generates a plurality of counting data (FMPRD data) for each half-period of the DEWBL signal. Then, the FMPRD data is transferred to a low pass filter (LPF) 903 to determine an average half-period of the DEWBL signal. The average of half-period of the DEWBL signal is then subtracted from the FMPRD data to generate differential data (PRDDIFF data) for each half-period of the DEWBL signal. The PRDDIFF data is transferred to ATIP data generating circuit 105 of FIG. 1.

In addition, the frequency demodulator 103 may generate the original ATIP data signal (ATIPORG signal) according to the PRDDIFF data for each half-period of the DEWBL signal. For example, if the PRDDIFF data for a given half-period of the DEWBL signal is positive or zero, the ATIPORG signal is provided at a high logic level; and if the PRDDIFF data for another half-period of the DEWBL signal is negative, the ATIPORG signal is provided at a low logic level (see FIG. 2). The ATIPORG signal is also transferred to the ATIP data generating circuit 105.

The apparatus in FIG. 1 further includes an ATIP clock generating circuit 110 for generating an ATIP clock signal (ATIPCLK signal) based on the DEWBL signal and for transferring the ATIPCLK signal to the ATIP data generating circuit 105. The ATIP clock generating circuit 110 includes a counting circuit 112 and an alignment signal generating circuit 114. The counting circuit 112 receives the DEWBL signal and counts the clock period of the DEWBL signal. When the DEWBL signal oscillates 3.5 periods, the counting circuit 112 generates a period of the ATIPCLK signal. Thus, a period of ATIPCLK signal is generated in every 3.5 periods of the DEWBL signal. The design of the ATIP clock generating circuit 110 is in order to meet the compact disc specification. The compact disc specification defines that 1-bit of ATIP data is to be generated every 3.5 periods of the wobble signal.

The alignment signal generating circuit 114 aligns the ATIPCLK signal with the DEWBL signal to improve the accuracy of the ATIP data generated by ATIP data generating circuit 105. The alignment signal generating circuit 114 receives the ATIPORG signal and the DEWBL signal, and monitors the ATIPORG signal. When a logic level of the ATIPORG signal is unchanged for a predetermined time period, the alignment signal generating circuit 114 generates an alignment signal (ALIGN signal) as shown in FIG. 3.

Figure 3:
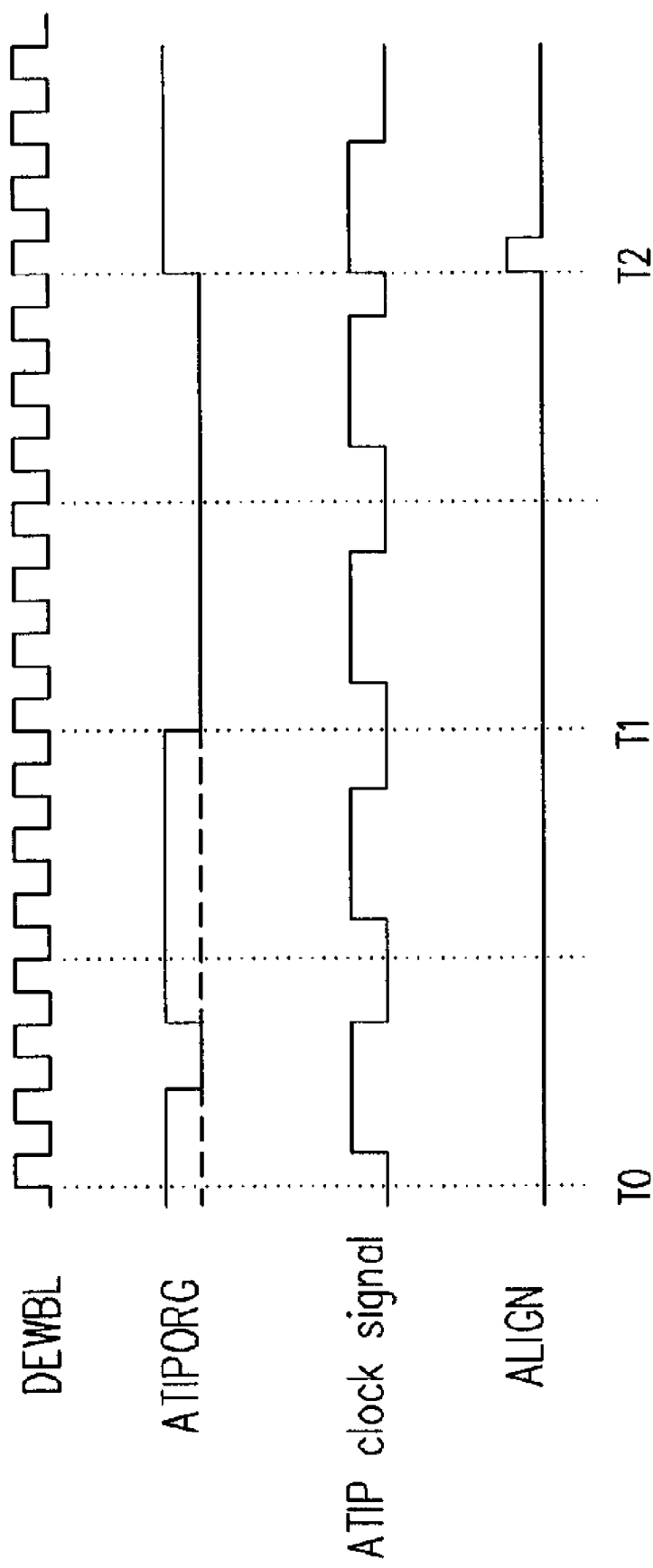
FIG. 3 is a timing diagram illustrating an alignment signal in accordance with an embodiment of the present invention.

FIG. 3 is a timing diagram illustrating an alignment signal in accordance with an embodiment of the present invention. In the embodiment of FIG. 1 and FIG. 3, during the seven consecutive periods of the DEWBL signal from time T1 through T2 the ATIPORG signal remains at a low logic level. Thus, the ALIGN signal is generated at time T2 and is sent to the counting circuit 112 so that the ATIPORG signal is aligned with the DEWBL signal at time T2 when the ATIPCLK signal transitions.

Referring to FIG. 1, the ATIP data generating circuit 105 is coupled to the frequency demodulator 103 and to the ATIP clock generating circuit 110. The ATIP data generating circuit 105 also receives the PRDDIFF data, the ATIPORG signal and the ATIPCLK signal, and also generates the ATIP data based on the ATIPORG signal and the ATIPCLK signal. As above mentioned, the compact disc specification defines that 1-bit ATIP data is to be generated every 3.5 periods of the wobble signal.

Figure 2:
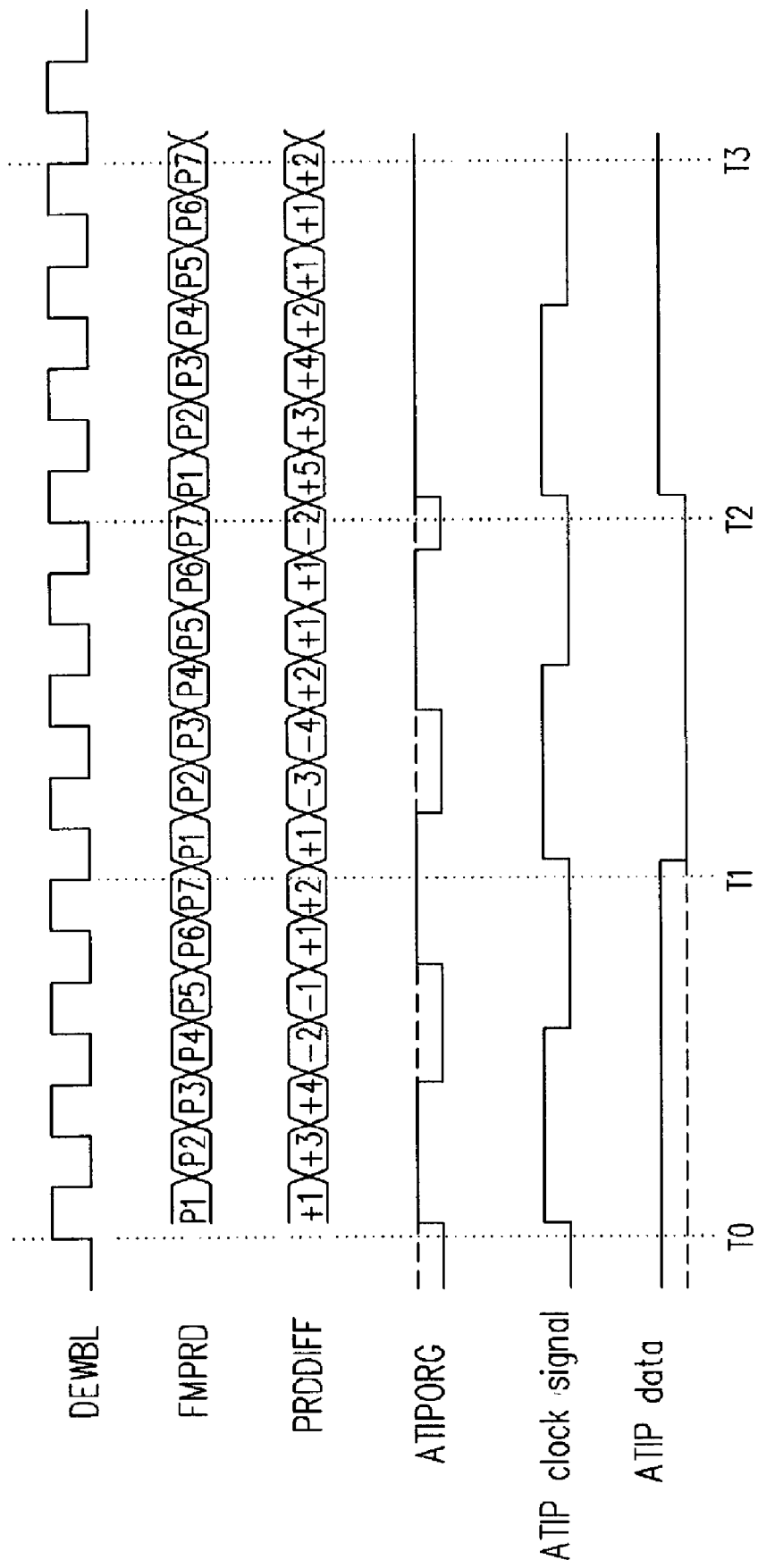
FIG. 2 is a timing diagram illustrating the generation of ATIP data in accordance with an embodiment of the present invention.

Referring to FIG. 2, an ATIPCLK signal is generated between times T0 and T1 (3.5 periods of the de-glitched wobble signal). However, the ATIPORG signal is at a high logic level when the PRDDIFF data is positive or zero, and the ATIPORG signal is at a low logic level when the PRDDIFF data is negative. At times it may be hard to determine if the ATIP data for a given period of the ATIP clock signal should be at a high logic level or a low logic level. Two methods of generating ATIP data are described below.

Method 1

Figure 5A:
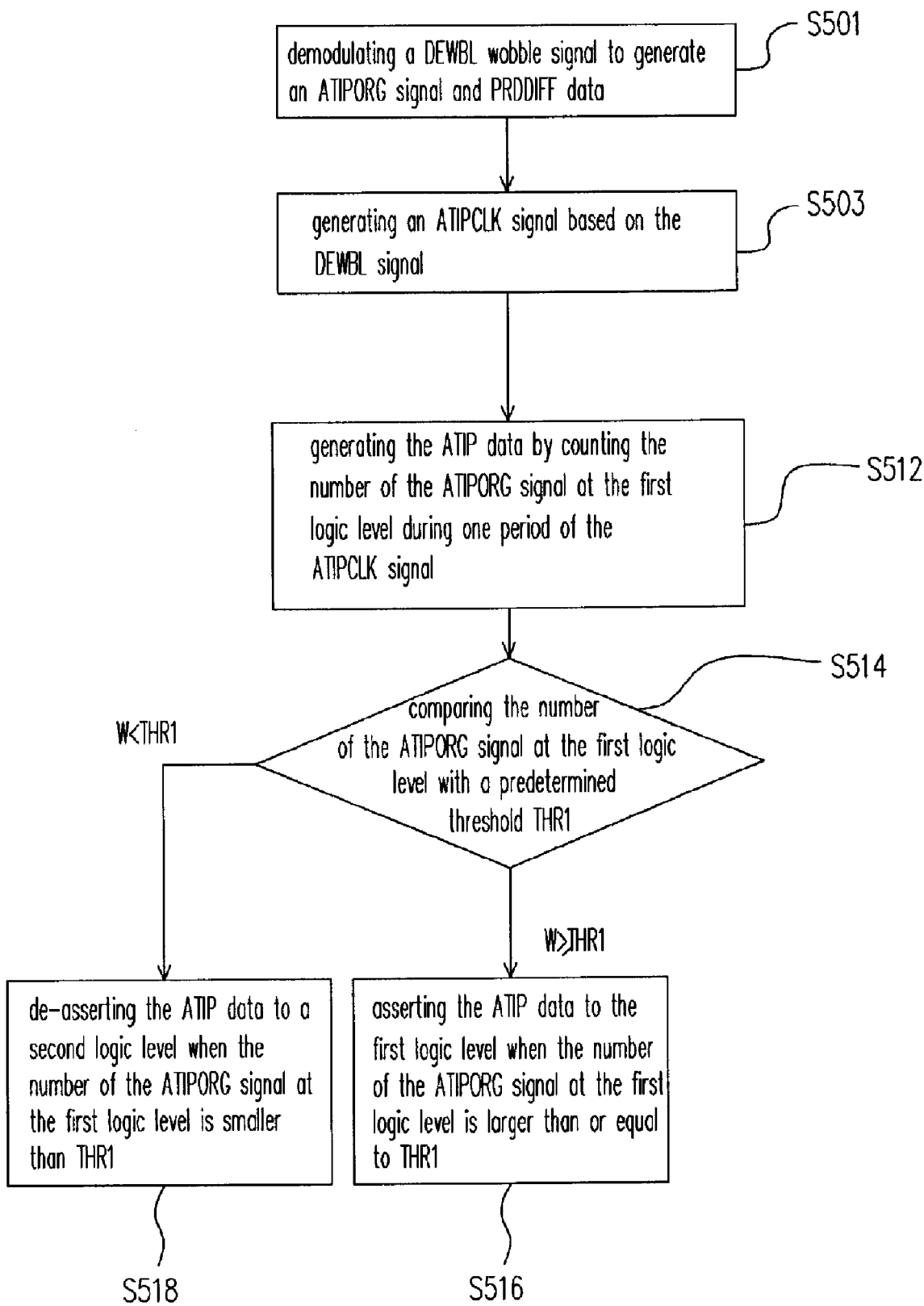
FIG. 5A is a flow chart of a method of generating ATIP data by using one predetermined threshold in accordance with an embodiment of the present invention.

FIG. 5A is a flow chart of the method of generating ATIP data using one predetermined threshold in accordance with an embodiment of the present invention. In FIG. 5A, the method includes demodulating a de-glitched wobble signal (DEWBL signal) to generate an original ATIP data signal (ATIPORG signal) and differential data (PRDDIFF data) (S501). An ATIP clock signal (ATIPCLK signal) is then generated based on the DEWBL signal (S503). One period of the ATIPCLK signal is generated every 3.5 periods of the DEWBL signal.

Referring to FIG. 1 and FIG. 5A, when the ATIP data generating circuit 105 receives the ATIPORG signal and the ATIPCLK signal, it generates the ATIP data by counting the number of measurement periods during a period of the ATIPCLK signal for which the ATIPORG signal is at a high logic level and then is at a low logic level (S512). For example, between times T0 and T1 of FIG. 2, the number of measurement periods for which the ATIPORG signal is at a high logic level is 5 (the +1, +3, +4, +1, and +2 of the first, second, third, sixth, and seventh half-clocks of the DEWBL signal), and the number of measurement periods for which the ATIPORG signal at low logic level is 2 (the −1 and −2 of the fourth and fifth half-clocks of the DEWBL signal).

Next, the number of high logic level measurement periods and low logic level measurement periods are compared to a predetermined threshold THR1 (S514). In one example, THR1 is 4. If the number of high logic level or low logic level measurement periods is larger than or equal to THR1, the ATIP data may be respectively asserted or de-asserted to a high logic level or a low logic level (S516). However, if the number of high logic level or low logic level measurement periods is smaller than THR1, the ATIP data may be respectively de-asserted or asserted to a low logic level or a high logic level (S518). In this example, the number of measurement periods at a high logic level is 5, which is larger than the predetermined threshold of 4. Thus, the 1-bit ATIP data for time T0 to T1 is asserted to a high logic level. However, this example is only one example of generating ATIP data.

Two thresholds may also be employed by the present invention. Please refer to FIG. 5B, which is a flow chart of a method of generating ATIP data by using two predetermined thresholds in accordance with an embodiment of the present invention. Similar to the above method, this method includes demodulating a DEWBL signal to generate an ATIPORG signal and PRDDIFF data (S501). The ATIPCLK signal is then generated according to the DEWBL signal (S503). One period of the ATIPCLK signal is generated every 3.5 period of the DEWBL signal.

Figure 5B:
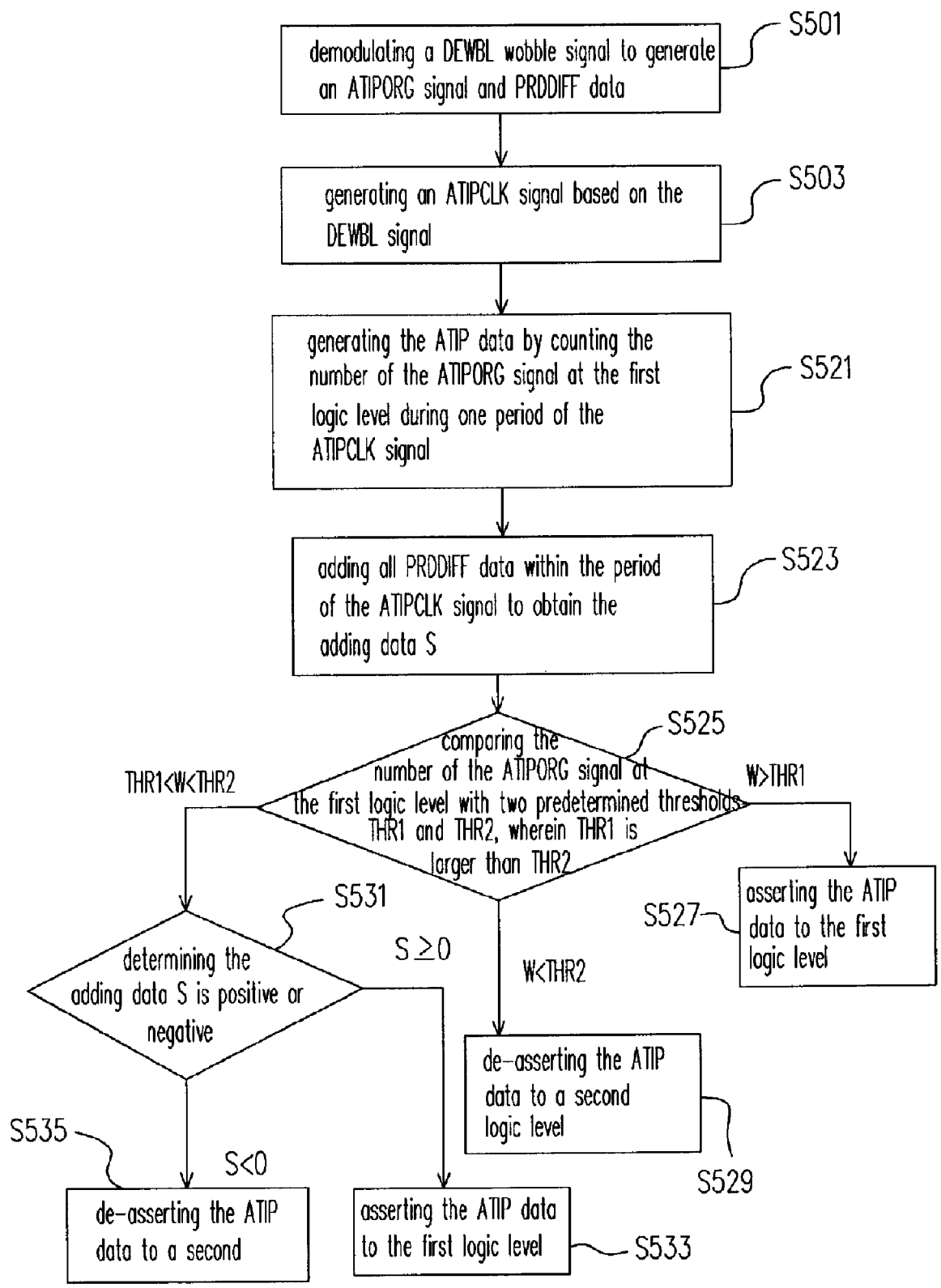
FIG. 5B is a flow chart of a method of generating ATIP data by using two predetermined thresholds in accordance with an embodiment of the present invention.

Referring to FIG. 1 and FIG. 5B, when the ATIP data generating circuit 105 receives the ATIPORG signal and the ATIPCLK signal, it generates the ATIP data by counting the number of measurement periods during a period of the ATIPCLK signal for which the ATIPORG signal at a high logic level and then at a low logic level (S512). As an example, between times T1 and T2 of FIG. 2, the number of measurement periods during a period of the ATIPCLK signal for which the ATIPORG signal at high logic level is 4 (the +1, +2, +1, and +1 of the first, fourth, fifth, and sixth half-clocks of the DEWBL signal), and the number of measurement periods during a period of the ATIPCLK signal for which the ATIPORG signal at low logic level is 3 (the −3, −4, and −2 of the second, third, and seventh half-clocks of the DEWBL signal).

Next, the PRDDIFF data for each measurement period of the period of the ATIPCLK signal are summed to obtain the adding data S (S523). In this example, the adding data S for the time between T1 and T2 is 4. Next, the number of high logic level and/or low logic level measurement periods is compared to two predetermined thresholds THR1 and THR2, wherein THR1 is larger than THR2 (S525).

In one example, THR1 is 5 and THR2 is 2. If the number of high logic level or low logic level measurement periods is larger than THR1, the ATIP data is respectively asserted or de-asserted to a high logic level or low logic level (S527). However, if the number of high logic level or low logic level measurement periods is lower than THR2, the ATIP data may be respectively de-asserted or asserted to a low logic level or high logic level (S529). If the number of high logic level or low logic level measurement periods is between thresholds THR1 and THR2, then it is determined whether the adding data S is positive or negative (S531). If the adding data S is positive, the ATIP data is asserted to a high logic level (S533). If the adding data S is negative, the ATIP data is de-asserted to a low logic level (S535).

In above mentioned example, the number of high logic level measurement periods is 4 and THR2 (2)<4<THR1 (5). Thus, it is determined whether the adding data S is positive or negative. In this example, the adding data S is −4 (<0) during the time between T1 and T2. Hence, the ATIP data is de-asserted to a low logic level for this time. This is the first method of generating 1-bit ATIP data for periods of the ATIP clock signal ATIPCLK.

Method 2

Figure 6:
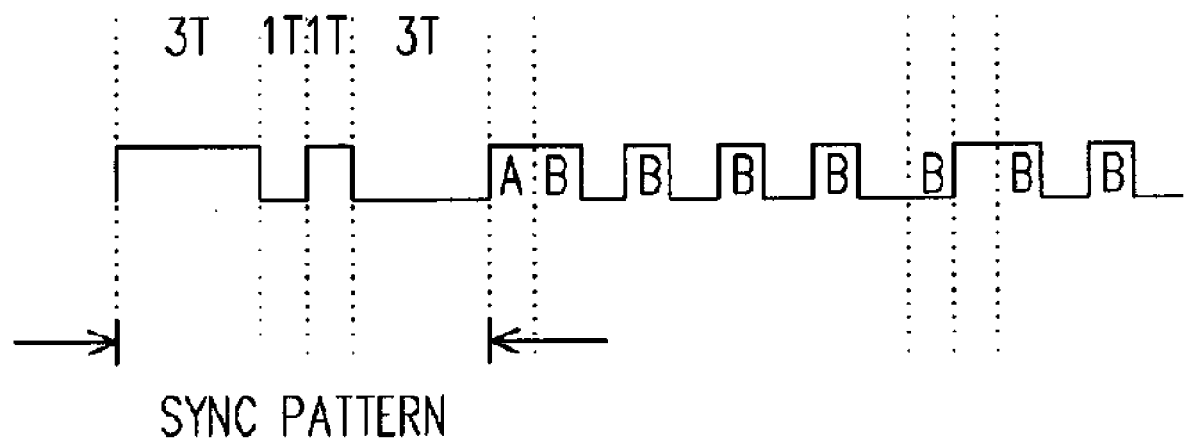
FIG. 6 illustrates a synchronization pattern in accordance with an embodiment of the present invention.

FIG. 6 is the synchronization pattern (sync pattern) in accordance with an embodiment of the present invention. The sync pattern represents the start of the disc data. The format of sync pattern is 3T-1T-1T-3T. When a sync pattern is detected, the data after the sync pattern follows the bi-phase rule as defined by the compact disc specification. The bi-phase rule includes two definitions. First, the first bit after the sync pattern (FIG. 6, bit A) is the inverse of the preceding bit. Second, each of the $2N^{th}$ bits following the sync pattern (FIG. 6, bits B) must be different from the $(2N+1^{st})$ bits following each of the $2N^{th}$ bits.

Therefore, when the sync pattern 3T-1T-1T-3T is read, the bi-phase rule is followed by the described method to generate the ATIP data. Although one example of a synchronization pattern is described, the scope of the present invention is not limited to the described pattern.

Figure 7:
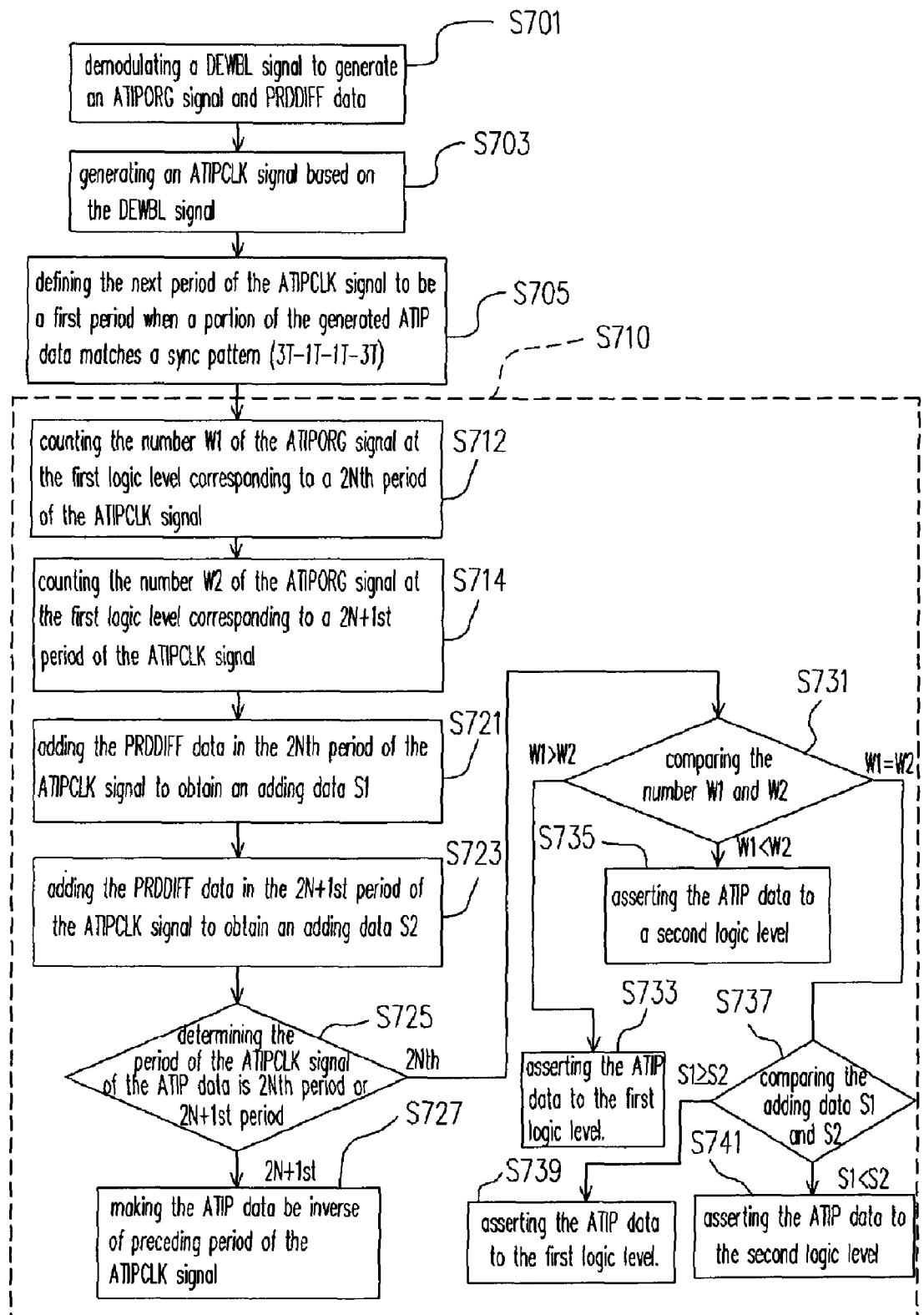
FIG. 7 is a flow chart of a method of generating ATIP data in accordance with an embodiment of the present invention by using the bi-phase rule.

FIG. 7 is a flow chart of a method of generating ATIP data in accordance with an embodiment of the present invention by using the bi-phase rule. Referring to FIG. 7, the first step is demodulating a DEWBL signal to generate an ATIPORG signal and PRDDIFF data (S701). An ATIPCLK signal is then generated according to the DEWBL signal (S703). One period of the ATIPCLK signal is generated every 3.5 period of the DEWBL signal. When a portion of the generated ATIP data matches a sync pattern (3T-1T-1T-3T), the next period of the ATIPCLK signal is defined as a first period (S705).

Next, at step 710, the ATIP data is generated according to the number of measurement periods for which the ATIPORG signal is at a high logic level for a $2N^{th}$ period of the ATIPCLK signal and the number of measurement periods for which the ATIPORG signal is at a high logic level for a $2N+1^{st}$ period of the ATIPCLK signal, wherein N is a positive integer.

The step S710 further includes counting the number W1 of measurement periods for which the ATIPORG signal is at a high logic level or a low logic level for a $2N^{th}$ period of the ATIPCLK signal (S712) and counting the number measurement periods for which W2 of the ATIPORG signal is at a high logic level or a low logic level for a $2N+1^{st}$ period of the ATIPCLK signal (S714). Then, the PRDDIFF data for the $2N^{th}$ period of the ATIPCLK signal is summed to obtain an adding data S1 (S721) and the PRDDIFF data for the $2N+1^{st}$ period of the ATIPCLK signal is summed to obtain an adding data S2 (S723).

Next, the period of the ATIPCLK signal of the ATIP data is determined as a $2N^{th}$ period or $2N+1^{st}$ period (S725). If the period of the ATIPCLK signal is determined to be a $2N+1^{st}$ period, the ATIP data made to be the inverse of preceding period of the ATIPCLK signal (S727). If the period of the ATIPCLK signal is a $2N^{th}$ period, W1 is compared to W2 (S731). If W1>W2, the ATIP data is asserted to a high logic level (S733). If W1<W2, the ATIP data is de-asserted to a low logic level (S735). If W1=W2, the adding data S1 is compared to adding data S2 (S737). If S1>=S2, the ATIP data is asserted to a high logic level (S739). If S1<S2, the ATIP data is de-asserted to a low logic level (S741).

Figure 8:
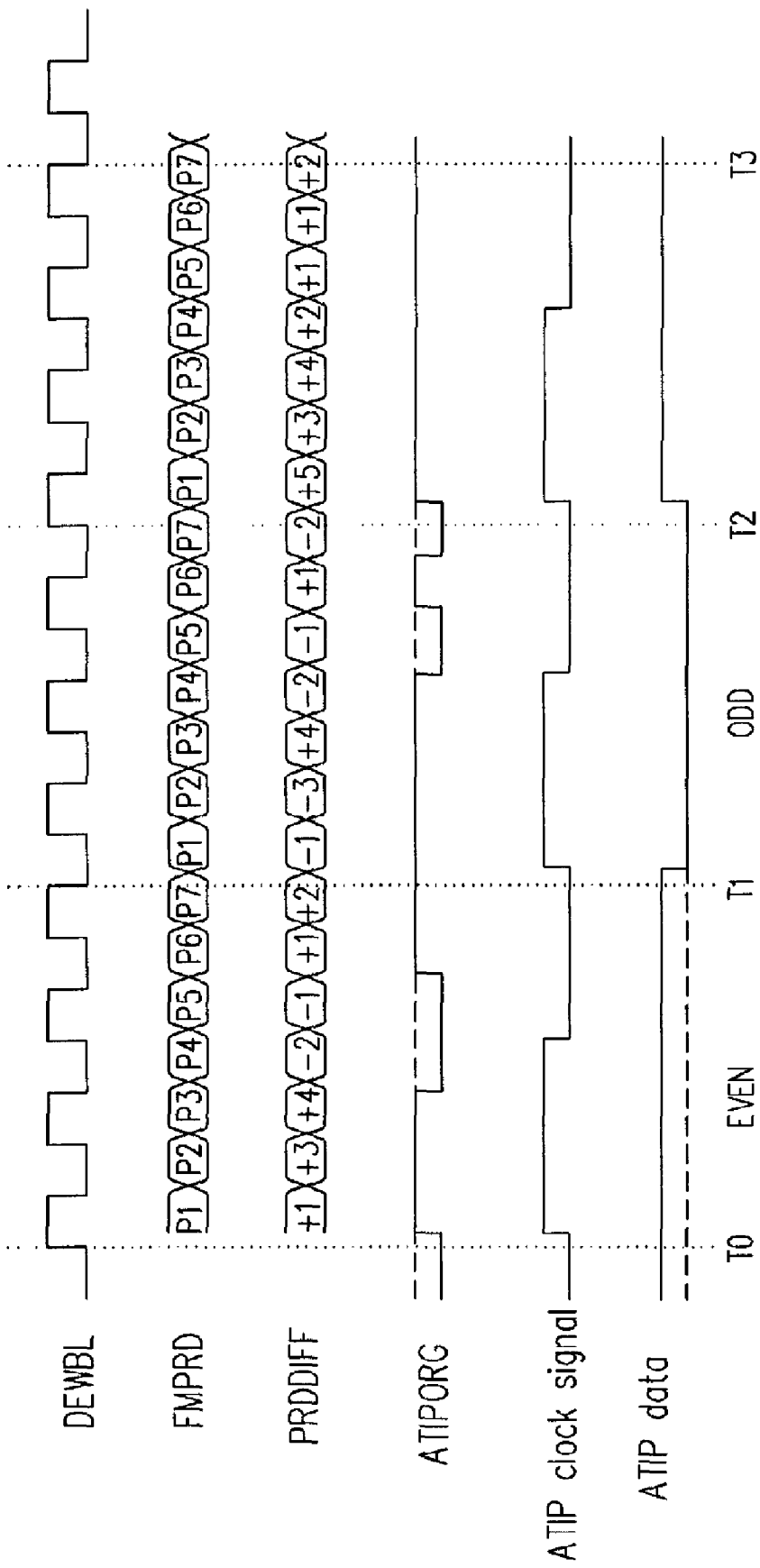
FIG. 8 is a timing sequence of generating an ATIP data in accordance with an embodiment of the present invention by using the bi-phase rule.

FIG. 8 is a timing sequence of generating the ATIP data signal in accordance with an embodiment of the present invention by using the bi-phase rule. When a portion of the generated ATIP data matches the sync pattern (3T-1T-1T-3T) shown in FIG. 6, the next period of the ATIPCLK signal is defined as a first period and is provided as the inverse of the ATIP data for the preceding period.

Next, the number W1 of measurement periods for which the ATIPORG signal is at a high logic level for a $2N^{th}$ period of the ATIPCLK signal (e.g., the EVEN period of the time between T0 and T1) and the number W2 of measurement periods for which the ATIPORG signal is at a high logic level for a $2N+1^{st}$ period of the ATIPCLK signal (e.g., the ODD period of time between T1 and T2) are counted. In this example, W1 is 5 and W2 is 2.

The PRDDIFF data for the $2N^{th}$ period of the ATIPCLK signal (e.g., the EVEN period) is summed to obtain adding data S1. The PRDDIFF data for the $2N+1^{st}$ period of the ATIPCLK signal (e.g., the ODD period) is also summed to obtain adding data S2. In this example, S1 is 8 and S2 is −4.

If the period of the ATIPCLK signal is a $2N^{th}$ period (e.g., EVEN period), W1 is compared to W2. Since W1 is 5 and W2 is 2, W1>W2, and the ATIP data for time T0 to T1 is asserted to a high logic level. If the period of the ATIPCLK signal is a $2N+1^{st}$ period (e.g., ODD period), the ATIP data is made to be the inverse of the preceding period of the ATIPCLK signal. In this example, the ODD period is at a low logic level which is the inverse of the preceding EVEN period of the ATIP data.

If W1=W2, the adding data S1 is compared to adding data S2. Since S1 is 8 and S2 is −4, S1>S2, and the ATIP data for time T0 to T1 is asserted to a high logic level.

In light of the above, the present invention uses the status of the ATIPORG signal corresponding to the ATIPCLK signal and the bi-phase rule to precisely generate the ATIP data.

The above description provides a full and complete description of the preferred embodiments of the present invention. Various modifications, alternate constructs, and equivalents may be made by those skilled in the art without changing the scope or spirit of the invention. Accordingly, the above description and illustrations should not be construed as limiting the scope of the invention which is defined by the following claims.

What is claimed is:

1. A method implemented by a component of an optical drive for reading Absolute Time in Pregroove (ATIP) data, the method comprising:
receiving a wobble signal;
generating an ATIP clock signal based, at least in part, on the wobble signal, wherein a period of the ATIP clock signal includes multiple measurement periods;
measuring a frequency of the wobble signal during each measuring period of the measuring periods;
determining an average frequency of the wobble signal;
providing an intermediate signal based, at least in part, on whether, for each measurement period, a frequency of the wobble signal during that measurement period is greater than the average frequency of the wobble signal;
providing the ATIP data on an ATIP data output based, at least in part, on a number of measurement periods of a period of the ATIP clock signal for which the intermediate signal is provided at a first logic level;
counting the number of measurement periods of the period of the ATIP clock signal for which the intermediate signal is provided at the first logic level;
comparing the number with a specified threshold;
providing the ATIP data output at the first logic level if the number is greater than or equal to the specified threshold; and
providing the ATIP data output at a second logic level if the number is less than the specified threshold.

2. The method of claim 1, wherein:
said determining an average frequency includes:
counting durations of half-periods of the wobble signal to obtain multiple counts, wherein each count represents a duration of a corresponding half-period, and wherein each half-period corresponds to a measurement period of the multiple measurement periods; and
low-pass filtering multiple counts to obtain an average count representing the average frequency of the wobble signal; and
said providing an intermediate signal includes:
subtracting the average count from each count for each measurement period to obtain difference data; and
generating the intermediate signal based on the obtained difference data.

3. The method of claim 1, wherein a period of the ATIP clock signal includes seven measurement periods, and wherein each measurement period corresponds to a half-period of the wobble signal, and wherein generating the ATIP clock signal includes:
counting the wobble signal to generate the ATIP clock signal; and
aligning the ATIP clock signal to the wobble signal at a point where a logic level of the intermediate signal has been unchanged for a specified period of time, wherein the specified period of time is a multiple of seven half-periods of the wobble signal.

4. A method implemented by a component of an optical drive for reading Absolute Time in Pregroove (ATIP) data, the method comprising:
receiving a wobble signal;
generating an ATIP clock signal based, at least in part, on the wobble signal, wherein a period of the ATIP clock signal includes multiple measurement periods;
measuring a frequency of the wobble signal during each measuring period of the measuring periods, wherein said measuring a frequency of the wobble signal includes:
digitizing the wobble signal to provide a digitized wobble signal; and
deglitching the digitized wobble signal;
determining an average frequency of the wobble signal;
providing an intermediate signal based, at least in part, on whether, for each measurement period, a frequency of the wobble signal during that measurement period is greater than the average frequency of the wobble signal; and
providing the ATIP data on an ATIP data output based, at least in part, on a number of measurement periods of a period of the ATIP clock signal for which the intermediate signal is provided at a first logic level.

5. A method implemented by a component of an optical drive for reading Absolute Time in Pregroove (ATIP) data, the method comprising:
receiving a wobble signal;
generating an ATIP clock signal based, at least in part, on the wobble signal, wherein a period of the ATIP clock signal includes multiple measurement periods;
measuring a frequency of the wobble signal during each measuring period of the measuring periods;
determining an average frequency of the wobble signal;
providing an intermediate signal based, at least in part, on whether, for each measurement period, a frequency of the wobble signal during that measurement period is greater than the average frequency of the wobble signal;
providing the ATIP data on an ATIP data output based, at least in part, on a number of measurement periods of a period of the ATIP clock signal for which the intermediate signal is provided at a first logic level; and
providing difference data for each measurement period representing a digitized difference between the frequency of the wobble signal during a corresponding measurement period and the average frequency of the wobble signal.

6. The method of claim 5, wherein said providing an intermediate signal includes:
providing the intermediate signal at a first logic level if the difference data or the corresponding measurement period is not negative; and
providing the intermediate signal at a second logic level if the associated difference data for the associated measurement period is negative.

7. The method of claim 5, further comprising:
counting a number of measurement periods during a period of the ATIP clock signal for which the intermediate signal is provided at a first logic level;
comparing the counted number with a first predetermined threshold and a second predetermined threshold, wherein the first predetermined threshold is greater than the second predetermined threshold;
providing the ATIP data output at the first logic level if the counted number is greater than the first predetermined threshold;
providing the ATIP data output at a second logic level if the counted number is less than the second predetermined threshold;
summing the difference data associated with each measurement period of a period of the ATIP clock;
providing the ATIP data output at the first logic level if the counted number is less than or equal to the first predetermined threshold, and is greater than or equal to the second predetermined threshold, and the summed difference data is greater than or equal to a third predetermined threshold; and providing the ATIP data output at the second logic level if the number is less than or equal to the first predetermined threshold, and is greater than or equal to the second predetermined threshold and the summed difference data is less than the third predetermined threshold.

8. The method of claim 5, further comprising:
detecting a synchronization pattern of the wobble signal, counting a number (W1) of measurement periods of a first period of the ATIP clock signal following the synchronization pattern for which the intermediate signal is provided at a first logic level;
counting a number (W2) of measurement periods of a second period of the ATIP clock signal following the synchronization pattern for which the intermediate signal is provided at the first logic level;
summing the difference data (S1) corresponding to each measurement period of the first period; and
summing the difference data (S2) corresponding to each measurement period of the second period.

9. The method of claim 8, further comprising:
providing the ATIP data output for the first period at the first logic level if W1>W2, or if both W1=W2 and S1≧S2; and
providing the ATIP data output for the first period at the second logic level if W1<W2, or if both W1=W2 and S1≦S2.

10. The method of claim 9, further comprising:
providing the ATIP data output for the second period as an inversion of the ATIP data output for the first period.

11. An apparatus for reading Absolute Time in Pregroove (ATIP) data, the apparatus comprising:
an ATIP clock generating circuit configured to receive a wobble signal and to generate an ATIP clock signal based, at least in part, on the received wobble signal, wherein a period of the ATIP clock signal includes multiple measurement periods, and wherein the ATIP clock generating circuit includes:
a counter configured to receive the received wobble signal and to provide the ATIP clock signal such that one period of the ATIP clock signal includes 7 half-periods of the wobble signal; and
an alignment signal generating circuit configured to detect a synchronization pattern of the wobble signal and to align the ATIP clock signal with the detected synchronization pattern;
a frequency demodulator configured to receive the wobble signal, to measure a frequency of the wobble signal, and to provide an intermediate signal for each measurement period that is based, at least in part, on whether a frequency of the received wobble signal during that measurement period is greater than an average frequency of the wobble signal; and an ATIP data generating circuit configured to receive the ATIP clock signal and the intermediate signal, and to provide an ATIP data output based, at least in part, on a number of measurement periods corresponding to a period of the ATIP clock signal for which the intermediate signal is at a first logic level.

12. The apparatus of claim 11, wherein the frequency demodulator comprises:
a high frequency counter configured to receive the wobble signal and to generate count data representing durations of half-periods of the wobble signal;
a low pass filter configured to receive the count data and to average the count data;
a subtraction circuit configured to receive the count data and the average count data and to provide difference data based, at least in part, on subtracting the average count data from the count data; and
a comparison circuit configured to receive the difference data and to provide the intermediate signal based on the difference data.

13. The apparatus of claim 12, wherein the comparison circuit is further configured to provide the intermediate signal at the first logic level if the difference data is greater than zero, and at a second logic level if the difference data is less than zero.

14. The apparatus of claim 13, further comprising:
an ATIP data generating circuit configured to receive the ATIP clock signal and the intermediate signal, and to provide an ATIP data output based, at least in part, on a number of measurement periods of one period of the ATIP clock signal for which the intermediate signal is at a first logic level and on the sum of the difference data associated with each measurement period of one period of the ATIP clock signal.

15. An apparatus for reading Absolute Time in Pregroove (ATIP) data, the apparatus comprising:
means for generating an ATIP clock signal based, at least in part, on a wobble signal, wherein a period of the ATIP clock signal includes multiple measurement periods;
means for measuring a frequency of the wobble signal, wherein the means for measuring the frequency of the wobble signal includes:
means for digitizing the wobble signal to provide a digitized wobble signal; and
means for deglitching the digitized wobble signal;
means for measuring an average frequency of the wobble signal;
means for providing an intermediate signal for each measurement period that is based, at least on part, on whether the frequency of the wobble signal during that measurement period is greater than the average frequency of the wobble signal; and
means for providing an ATIP data output based, at least in part, on a number of measurement periods of one period of the ATIP clock signal for which the intermediate signal is at a first logic level.

* * * * *

UNITED STATES PATENT AND TRADEMARK OFFICE
CERTIFICATE OF CORRECTION

PATENT NO. : 7,995,434 B2  
APPLICATION NO. : 12/342004  
DATED : August 9, 2011  
INVENTOR(S) : Liow et al.

It is certified that error appears in the above-identified patent and that said Letters Patent is hereby corrected as shown below:

Title Page 2, item (56), under "Foreign Patent Documents", in Column 1, Line 8, delete "CN 1659312 A" and insert -- CN 1658312 A --.

Title Page 2, item (56), under "Other Publications", in Column 2, Line 18, delete "Patentablility" and insert -- Patentability --.

Column 1, line 9, delete "Mar. 31, 2005." and insert -- Mar. 31, 2004. --.

Column 11, line 11, in Claim 8, delete "signal," and insert -- signal; --.

Column 12, line 48, in Claim 15, delete "at least on part," and insert -- at least in part, --.

Signed and Sealed this  
Seventh Day of February, 2012

David J. Kappos  
*Director of the United States Patent and Trademark Office*